L. BABOS.
HOSE COUPLING.
APPLICATION FILED JUNE 13, 1914.

1,136,502.

Patented Apr. 20, 1915.

WITNESSES:
A. L. Bowen.
E. Piterson.

INVENTOR:
Lacey Babos
BY
Pierre James
ATTORNEY

THE NORRIS PETERS CO., PHOTO-LITHO., WASHINGTON, D. C.

UNITED STATES PATENT OFFICE.

LACEY BABOS, OF WINSLOW, WASHINGTON.

HOSE-COUPLING.

1,136,502.
Specification of Letters Patent.
Patented Apr. 20, 1915.

Application filed June 13, 1914. Serial No. 844,984.

*To all whom it may concern:*

Be it known that I, LACEY BABOS, a subject of the King of Hungary, residing at Winslow, in the county of Kitsap and State of Washington, have invented certain new and useful Improvements in Hose-Couplings, of which the following is a specification.

This invention relates to hose or pipe couplings; and its object is the provision of a simple and inexpensively constructed device of this character which will be easy to couple or separate and which will be efficient in operation.

With these ends in view, the invention consists in the novel construction, adaptation and combination of parts as will be hereinafter described and claimed.

Figure 1:
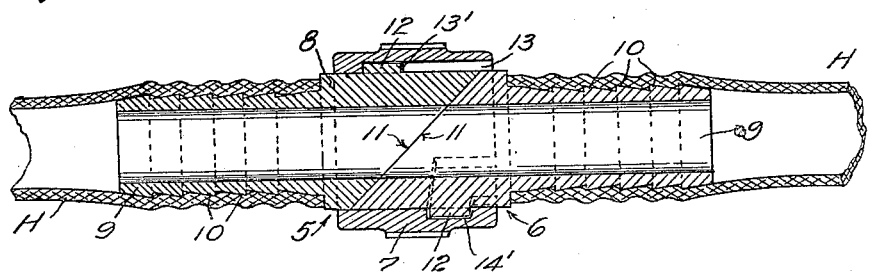
Figure 3:
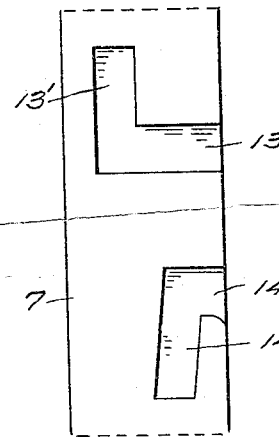
Figure 4:
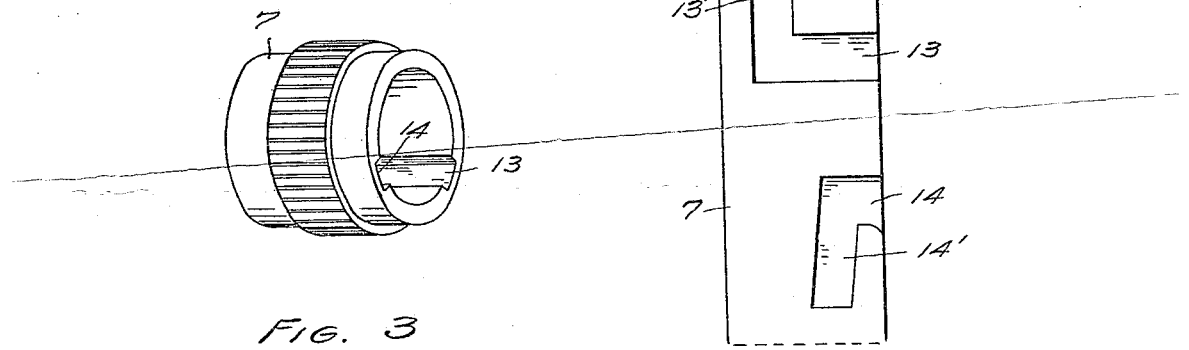
Figure 2:
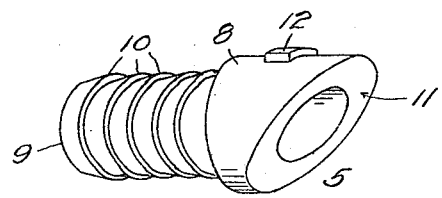

In the accompanying drawings, Figure 1 is a vertical longitudinal sectional view of the coupling assembled. Fig. 2 is a perspective view of one of the coupling members. Fig. 3 is a perspective view of the clamping sleeve and Fig. 4 is an interior expanded view of the same.

The coupling is comprised of two coupling members 5 and 6 and a sleeve member 7. Each coupling member, like that shown in Fig. 2, is of a tubular form having a diagonally truncated cylindrical head 8 at one end and a nipple 9 at the other end. The nipple is desirably provided with external annular ridges 10 for conveniently engaging the nipple within the end of a hose section H. The other extremity of each head is similarly beveled to afford a plane face 11 inclined from the axis of the coupling.

Projecting radially from each coupling head is a lug or protuberance 12 which is positioned upon the periphery of the head and medially of a plane projected through the major axis of the respective face 11. The sleeve 7 is bored or otherwise formed to fit over the peripheral surfaces of the heads 8 of both coupling members. Said sleeve is provided in its internal periphery with two L-shaped slots respectively composed of branches 13, 13¹ and 14, 14¹. The branches 13 and 14 are arranged in parallelism and extend from one end of the sleeve and the branches 13¹ and 14¹ extend in reverse directions from the inner ends of the associated parallel branches. The groove branch 13¹ is disposed circumferentially to be at right angles or nearly so, to the axes of the sleeve. The branch 14¹, however, is arranged helically with respect to the periphery of the sleeve.

To assemble the coupling the sleeve 7 is first connected to the coupling member 5 by introducing the head 8 of the latter into the sleeve and with the protuberance 12 in the groove element 13 until the protuberance arrives at the branch 13¹ whereupon the sleeve is rotated to engage such protuberance in the branch. The other coupling member 6 then has its head 8 introduced into the sleeve with the slot part 14 receiving the protuberance 12 of this member and when the sleeve is rotated the protuberance 12 of member 6 is engaged in the slot branch 14 which, being of a spiral shape, will cause the heads of the two members 5 and 6 to be brought into juxtaposition and the faces 11 thereof to afford a fluid-tight joint. By having the meeting ends of the coupling members inclined, they constitute a scarf, or overlapping connection, and contribute with the sleeve in which the heads fit, to retain the members in axial alinement. The coupling is formed of but three pieces and is readily operated both in coupling and disconnecting the same.

What I claim as my invention, is—

1. A hose coupling comprising two coupling members, a lug carried by each member being diametrically-disposed in assembled condition, and a coupling sleeve associated therewith, a pair of bayonet slots formed on the inner face of the sleeve opening at the same end thereof and lying on one side of the diametrical axis of the sleeve with the inner extensions of the slots disposed in opposite directions, one of said slots disposed at an angle relative to the circumference of the sleeve whereby said sleeve is caused to move in opposite directions to bring the coupling members into juxtaposition.

2. A hose or pipe coupling comprising two coupling members having inclined meeting faces and provided with lugs projecting from the outer peripheral surface of the respective members on the sides of greatest width, and a sleeve adapted to receive the ends of said members, said sleeve being provided with two lug-receiving slots extending from the same end of the sleeve disposed on one side of a diameter of the sleeve and communicating with circumferentially disposed branches similarly positioned and extending in opposite directions, one of said branches being arranged in helical relation whereby the lugs are drawn toward each other when the sleeve is turned to cause the faces of the members to be juxtaposed with each other.

3. A hose or pipe coupling comprising two coupling members having inclined meeting faces, and each provided with an outwardly projecting lug, and a single sleeve adapted to receive the ends of both of said coupling members, said sleeve being provided interiorly with two slots for the engagement of the respective lugs, both of said slots extending from the same end of the sleeve, one of said slots being provided with a circumferentially extending branch at right angles to said slot, the other slot having a circumferentially extending branch extending in helical relation from said last-named slot.

4. A hose or pipe coupling comprising two coupling members having inclined faces, and each provided with an outwardly projecting lug, and a single sleeve adapted to receive the ends of both of said coupling members, said sleeve being provided interiorly with two parallel slots adapted to receive the respective lugs and each having a circumferentially disposed branch, said branches extending in opposite directions within the sleeve.

5. A hose or pipe coupling comprising two coupling members having inclined faces, and each provided with an outwardly projecting lug, and a single sleeve adapted to receive the ends of both of said coupling members, said sleeve being provided interiorly with two parallel slots spaced apart a distance less than the inside diameter of the sleeve, and each adapted to receive the respective lugs, and each having a circumferentially-disposed branch, said branches extending in opposite directions within the sleeve and in substantial alinement.

Signed at Seattle, Wash., this 6th day of June, 1914.

LACEY BABOS.

Witnesses:
PIERRE BARNES,
F. G. KLANNIG.

Copies of this patent may be obtained for five cents each, by addressing the "Commissioner of Patents, Washington, D. C."